Sept. 2, 1952          M. A. CULLING          2,608,895
SURFACING METHOD AND APPARATUS
Filed March 13, 1950          2 SHEETS—SHEET 1

INVENTOR MERRITT A. CULLING
BY *Donald G. Arlah*
ATTORNEY

Sept. 2, 1952     M. A. CULLING     2,608,895
SURFACING METHOD AND APPARATUS

Filed March 13, 1950     2 SHEETS—SHEET 2

INVENTOR MERRITT A. CULLING
BY
ATTORNEY

Patented Sept. 2, 1952

2,608,895

UNITED STATES PATENT OFFICE 2,608,895

SURFACING METHOD AND APPARATUS

Merritt A. Culling, Louisiana, Mo., assignor to the United States of America as represented by the Secretary of the Interior Application March 13, 1950, Serial No. 149,418

5 Claims. (Cl. 82—4)

(Granted under the act of March 3, 1883, as amended April 30, 1928; 370 O. G. 757)

My invention relates to a method and an apparatus for obtaining a smooth surface on metal, wooden or other surfaces.

The invention described and claimed herein may be used by the Government of the United States or for governmental purposes without payment of any royalties by the United States or any agency thereof.

An object of my invention is to provide a method and apparatus to plane a surface, removing irregular or uneven areas therefrom.

A further object of my invention is to provide a method and apparatus for removing in successive layers the ridges of an irregular surface.

A still further object of my invention is to provide a method and apparatus to be employed in surfacing an otherwise irregular surface by removing the raised portions of said irregular surface without removing any part of the valleys between said raised portions of said irregular surface.

Figure 1:
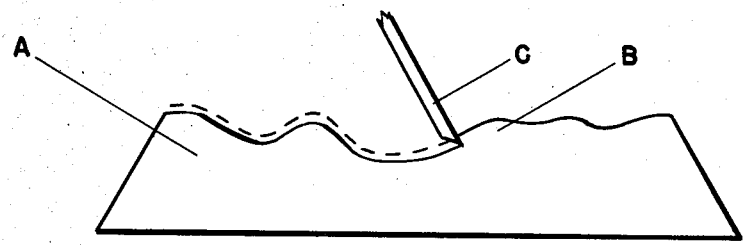
Figure 2:
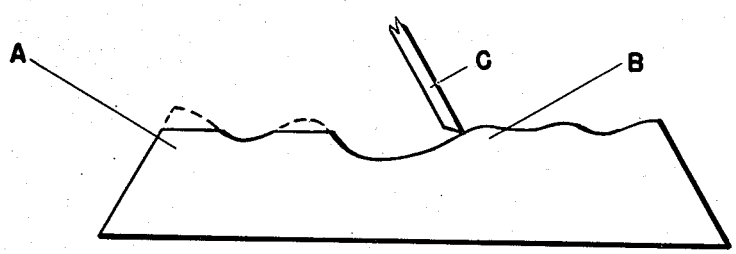
Figure 3:
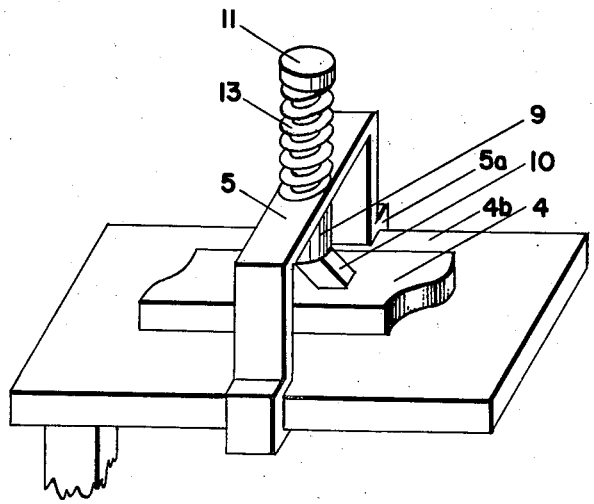
Figures 4, 5, 6:
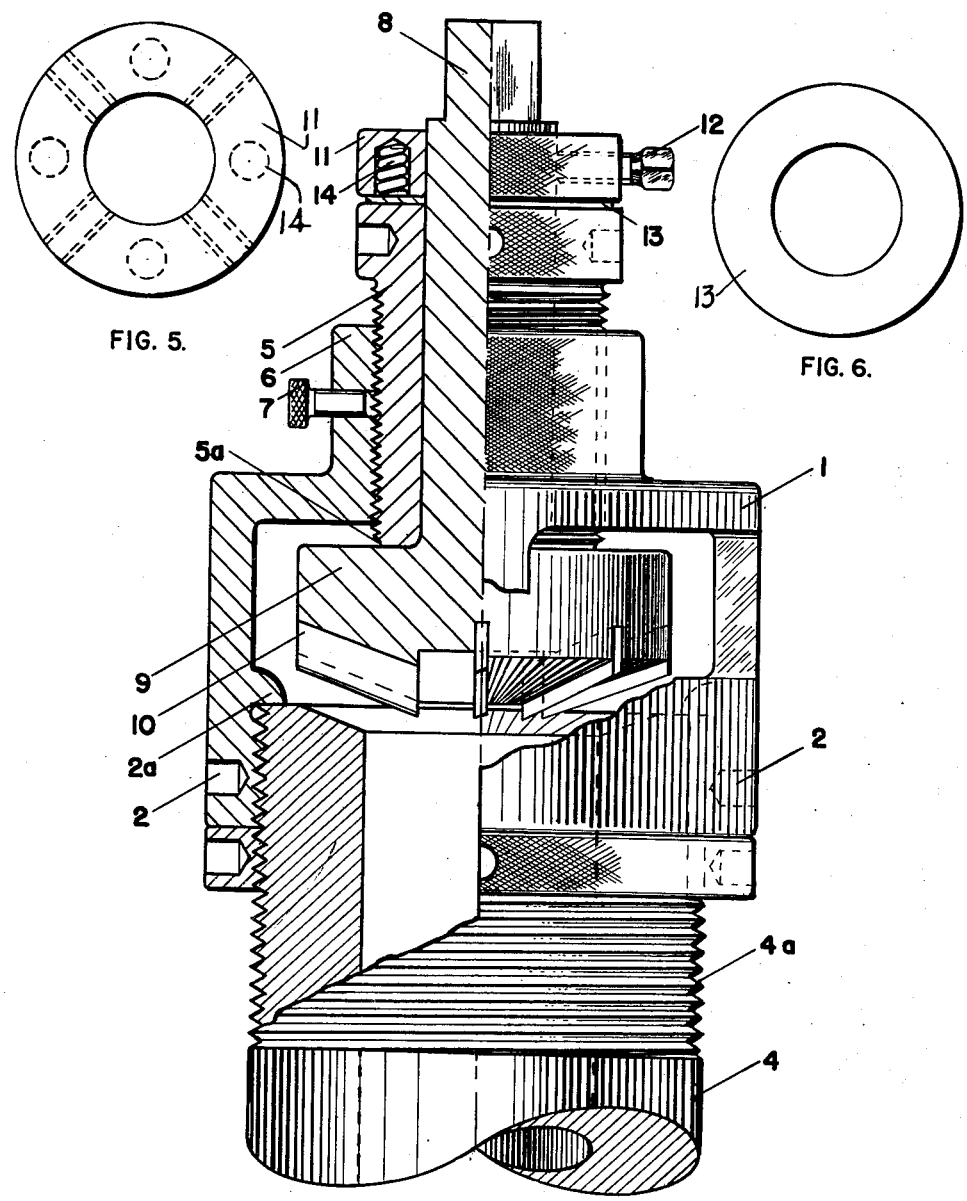

A better understanding can be had of my invention by reference to the accompanying drawings in which:

Fig. 1 is a schematic diagram of an irregular surface of any selected material a part of which has been smoothed by conventional methods and apparatus heretofore employed, Fig. 2 is a schematic diagram of an irregular surface of the same material a part of which has been smoothed by my improved method and apparatus, Fig. 3 is a view of an apparatus in one form as may be employed in the practice of my invention, Fig. 4 is another form of apparatus as may be employed in the practice of my invention, and Figs. 5 and 6 show details of certain parts embodied in the apparatus illustrated in Fig. 4.

This invention arose as a problem of reseating the ends of pipe used in high-pressure, high-temperature industrial plants. The ends of pipe so used are required to have an internal inclined surface, in common practice produced by a reaming tool, the pipe and the tool being held in a lathe during the operation. In the precision required for piping connections to carry pressures of 10,000 p. s. i. and withstand temperatures of 900° F. any slight irregularity in the surface of the seat will be the source of trouble. To seat or reseat the ends of the pipe in a lathe is not always possible due to the necessity of disconnecting the length of pipe and transporting the same to the lathe in the machine shop. When this is done with the attendant loss of time and the labor involved, the finished work is not necessarily satisfactory for reasons as will appear later in my specification.

Fig. 1 shows an edge view of a section of stock material A having an irregular surface B which one desires to smooth. The conventional cutting tool C, the side of which is shown, may be shaped similar to the knife of a wood plane and for purposes of illustration the stock material being worked might be wood. As is well known the knife C would normally me mounted in a frame of elongated rectangular shape and would be worked in a direction from left to right. A good workman would next adjust the knife C in the frame so that the frame would glide on the higher places and the peaks would thus be removed as the knife engages them. One would also bear down on the plane to keep the knife C in contact with the material to be cut. By more or less trial and error one could adjust the depth of cut, depending upon the over-all length of the frame supporting the knife C and the number and spacing of the highest remaining peaks or ridges. It is obvious that in so doing the gauge is not the valleys between the peaks and the result is indicated by the dotted line, the knife C following the contour of the surface and cutting into the valleys and the sides of the peaks in a somewhat haphazard manner.

Fig. 2 represents the method employed in my invention, the stock material A having an irregular surface B and the irregularities being removed by the cutter C as in Fig. 1. It will be observed that here we have removed only the peaks or ridges and not the valleys or portions in between. This is accomplished by not permitting the ridges of the material worked on to be a gauge for the depth of cutting.

I am of course familiar with the construction of lathes, planing machines and the like where the cutting tool is fed against the material by manual or automatic adjustment between the two. In very precise machines there is usually a small amount of play in the adjustment, occasioned by the threads themselves or merely sufficient to permit free rotary movement without undue friction between the parts. This play must be eliminated in a satisfactory manner without increasing friction due to the fact that the cutting tool would otherwise variously engage the surface to be worked, follow the valleys between the ridges and in many cases would enlarge them. By placing a spring between the two parts, the cutting tool and the material being worked, so arranged as to keep these two in contact just as one bears against a wood plane, our difficulty is greater rather than lessened. I have found it necessary to so arrange the cutting tool and the surface to be worked, that the two are totally independent at all times, and regardless of play in the parts occasioned by the necessity to reduce friction or the play occasioned by the threads themselves, these factors can not affect the operation.

Instead of employing a spring to force the cutting tool and the material together at all times, I have found it important to employ a spring to force the cutting tool away from the material, causing it to ride against a bearing surface at all times, the bearing surface being a part of the assembly holding the cutting tool. A better understanding of this can be had by referring to Fig. 3.

Fig. 3 shows a stand or work table 4b having thereon a piece of stock material 4 to be worked. Cutter 10 is mounted in a chuck 9 which at all times bears against a supporting shoulder 5 which in turn by appropriate construction would be rigidly supported with respect to work table 4b for any specified depth of cutting and of course in a commercial embodiment would be adjustable. Chuck 9 is integral with a shaft extending through the supporting shoulder 5 and on the upper end would be a collar 11. Intermediate between supporting shoulder 5 and collar 11 a spring 13 is provided to keep chuck 9 firmly against the bottom of shoulder 5 at all times. Of course in a commercial embodiment of this invention motive power and adjustments for either tool or work movement would be provided. Having described the method and a simple adaptation of the method in actual apparatus we will now turn to the device as actually employed for the seating or reseating of pipe used where a high degree of precision is a necessity.

Fig. 4 shows a cap 1 having internal threads shown in engagement with the external threads 4a of a section of pipe 4, the reseating of which is desired. The upper end 6 of cap 1 has an aperture threaded to receive a plug 5 similarly threaded and plug 5 may be locked in any desired position by means of locking screw 7. Extending through plug 5 and having bearings on both ends thereof, I provide a reamer assembly comprising a round shaft 8 the upper end of which is squared and the lower end of which carries the cutter head 9 with cutting blades 10. Intermediate between the upper end of shaft 8 and the top of plug 5 I provide a collar 11 having set screws 12 to secure the same to shaft 8 and intermediate between collar 11 and the top of plug 5 is provided a washer 13. In an inexpensive tool the washer 13 might take the form of a split washer but the resiliency thereof would not be dependable enough for many precision operations contemplated by my invention.

Fig. 5 shows collar 11 in greater detail with the set screws around the periphery thereof and extending through to the central aperture thereof. The bottom side of collar 11 is illustrated and is shown as having recesses distributed over the surface in which recesses are mounted a series of coil springs 14.

Fig. 6 shows the washer 13 which is necessary to retain the springs 14 in collar 11 and to assist in providing a bearing surface against the top of plug 5. Referring again to Fig. 4 it will be observed that cutter head 9 bears against the lower end 5a of plug 5 and this is maintained by virtue of the locked position of collar 11 on shaft 8 and the pressure exerted by the aforementioned springs 14 contained therein and which bear against the washer 13 and which in turn bears against the upper end of plug 5.

A detail of securing cap 1 on the tubing to be worked so as to prevent any movement between the two is an important matter. This can be accomplished by means of set screws 2 or by means of a projecting ridge 2a which acts as a stop. The obvious disadvantage of employing set screws 2 is that the threads 4a of the pipe 4 might be thereby damaged and the sole use of a projecting ridge 2a is limited to reaming operations where the direction in which the cutting head is turned would be that which forces the tool against the stock.

I realize that there are many modifications of my invention in method and apparatus other than that illustrated or described herein, however it is to be distinctly understood that my invention is limited only by the following claims. I claim:

1. A pipe refacing tool comprising in combination a cup-shaped member adapted to be secured to the end of a pipe, a threaded plug engaging a threaded section of said cut and adjustable therein, a shaft extending axially through said plug, cutting means attached to the end of said shaft adjacent the inner end of said plug member, a bearing surface on the inner end of said plug engaging a corresponding bearing surface on said shaft and cutter assembly for limiting the axial thrust of said shaft outwardly of said plug, a collar secured to said shaft adjacent the outer end of said plug and a spring member held in compression between said collar and the outer end of said plug for resiliently urging said shaft outwardly of said plug, thereby resiliently urging said bearing surfaces into contact with one another.

2. A rotary planing tool comprising a shaft, a plug member rotatably supporting said shaft, cutting means attached to the end of said shaft adjacent the inner end of said plug member, supporting means for maintaining said plug and shaft assembly in fixed relation to the surface to be planed, a bearing surface on the inner end of said plug member engaging a corresponding bearing surface on said shaft and cutter assembly for limiting the axial thrust of said shaft outwardly of said plug, a collar secured to said shaft adjacent the outer end of said plug member, resilient means disposed between said collar and the outer end of said plug member for resiliently urging said shaft outwardly of said plug, thereby resiliently urging said bearing surfaces into contact with one another.

3. A rotary planing tool comprising a shaft, a plug member rotatably supporting said shaft, cutting means attached to the end of said shaft adjacent the inner end of said plug member, supporting means for maintaining said plug and shaft assembly in fixed relation to the surface to be planed, said plug being axially adjustable in said supporting means whereby said plug and shaft assembly may be adjusted axially of said surface, a bearing surface on the inner end of said plug member engaging a corresponding bearing surface on said shaft and cutter assembly for limiting the axial thrust of said shaft outwardly of said plug, a collar secured to said shaft adjacent the outer end of said plug member, resilient means disposed between said collar and the outer end of said plug for resiliently urging said shaft outwardly of said plug member, thereby resiliently urging said bearing surfaces into contact with one another.

4. A rotary planing tool comprising a shaft, a plug member rotatably supporting said shaft, cutting means attached to the end of said shaft adjacent the inner end of said plug member, supporting means for maintaining said plug and shaft assembly in fixed relation to the surface to be planed, said plug member being axially adjustable in said supporting means whereby said plug and shaft assembly may be adjusted axially of said surface, means for locking said plug member in a fixed position with respect to said supporting means, a bearing surface on the inner end of said plug member engaging a corresponding bearing surface on said shaft and cutter assembly for limiting the axial thrust of said shaft outwardly of said plug, a collar detachably secured to said shaft adjacent the outer end of said plug member, resilient means disposed between said collar and the outer end of said plug for resiliently urging said shaft outwardly of said plug, thereby resiliently urging said bearing surfaces into contact with one another.

5. A pipe refacing tool comprising in combination a cup-shaped member having internal threads adapted to engage the external threads of a pipe to be refaced, a plug member threaded to move axially within said cup-shaped member, a shaft extending through said plug and free to rotate with respect thereto, cutting means attached to the end of said shaft adjacent the inner end of said plug member, a bearing surface on the inner end of said plug member engaging a corresponding bearing surface on said shaft and cutter assembly for limiting the axial thrust of said shaft outwardly of said plug, a collar secured to said shaft adjacent the outer end of said plug member, a plurality of springs held in compression between said collar and the outer end of said plug member for resiliently urging said shaft axially outwardly of said plug member, thereby resiliently urging said bearing surfaces into contact with one another.

MERRITT A. CULLING.

REFERENCES CITED

The following references are of record in the file of this patent:

UNITED STATES PATENTS

| Number | Name | Date |
|---|---|---|
| 1,726,801 | Billger | Sept. 3, 1929 |
| 2,103,377 | Norton | Dec. 28, 1937 |
| 2,106,201 | Aab | Jan. 25, 1938 |
| 2,460,985 | Jackson | Feb. 8, 1949 |